US011268005B2

(12) United States Patent
Nalepa et al.

(10) Patent No.: US 11,268,005 B2
(45) Date of Patent: *Mar. 8, 2022

(54) HIGH DENSITY AQUEOUS WELL FLUIDS

(71) Applicant: Albemarle Corporation, Charlotte, NC (US)

(72) Inventors: Christopher J. Nalepa, Zachary, LA (US); Jacobus N. Louwen, Hoorn (NL); Yunqi Liu, Baton Rouge, LA (US); Gregory H. Lambeth, Baton Rouge, LA (US); Srinivasa S. Godavarthy, Fort Mill, SC (US); Kevin Coppola, Baton Rouge, LA (US)

(73) Assignee: Albemarle Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/789,749

(22) Filed: Feb. 13, 2020

(65) Prior Publication Data

US 2020/0181471 A1  Jun. 11, 2020

Related U.S. Application Data

(63) Continuation of application No. 15/502,914, filed as application No. PCT/US2015/041662 on Jul. 23, 2015, now Pat. No. 10,597,574.

(60) Provisional application No. 62/036,912, filed on Aug. 13, 2014, provisional application No. 62/103,668, filed on Jan. 15, 2015, provisional application No. 62/185,171, filed on Jun. 26, 2015.

(51) Int. Cl.
*C09K 8/05* (2006.01)

(52) U.S. Cl.
CPC ..................... *C09K 8/05* (2013.01)

(58) Field of Classification Search
CPC ..................... C09K 8/05; C02F 1/00
See application file for complete search history.

(56) References Cited

U.S. PATENT DOCUMENTS

| | | | |
|---|---|---|---|
| 2,898,294 A | 8/1959 | Priest et al. | |
| 4,248,850 A | 2/1981 | Keblys | |
| 4,304,677 A | 12/1981 | Stauffer et al. | |
| 4,725,372 A | 2/1988 | Teot et al. | |
| 4,728,446 A | 3/1988 | Doty et al. | |
| 5,198,679 A | 3/1993 | Katoh et al. | |
| 5,576,271 A | 11/1996 | Patel | |
| 5,593,650 A | 1/1997 | Prinz et al. | |
| 6,100,222 A | 8/2000 | Vollmer et al. | |
| 6,194,355 B1 | 2/2001 | Jarrett et al. | |
| 6,632,779 B1 | 10/2003 | Vollmer et al. | |
| 6,730,234 B2 | 5/2004 | Symens et al. | |
| 6,762,154 B2 | 7/2004 | Lungwitz et al. | |
| 6,784,140 B2 | 8/2004 | Kippie et al. | |
| 6,959,767 B2 | 11/2005 | Horton et al. | |
| 7,011,445 B1 | 3/2006 | Hamilton et al. | |
| 7,867,951 B2 | 1/2011 | Knox et al. | |
| 9,650,558 B2 | 5/2017 | Gupta et al. | |
| 2003/0114318 A1 | 6/2003 | Benton et al. | |
| 2003/0220202 A1 | 11/2003 | Foxenberg et al. | |
| 2005/0101490 A1 | 5/2005 | Vollmer | |
| 2006/0127301 A1 | 6/2006 | Elitzur et al. | |
| 2008/0135302 A1 | 6/2008 | Zhang et al. | |
| 2009/0107671 A1 | 4/2009 | Waters et al. | |
| 2011/0190530 A1 | 8/2011 | Knox | |
| 2013/0178399 A1 | 7/2013 | Falana et al. | |
| 2014/0256602 A1 | 9/2014 | Ravi et al. | |
| 2016/0229705 A1* | 8/2016 | St. John | |
| 2018/0298266 A1 | 10/2018 | Marr | |

FOREIGN PATENT DOCUMENTS

| | | |
|---|---|---|
| GB | 2408536 B | 2/2006 |
| JP | 04338117 A | 11/1992 |
| RU | 2412958 C2 | 2/2011 |
| RU | 2620672 C2 | 5/2017 |
| WO | 9726311 A1 | 7/1997 |
| WO | 9923188 A1 | 5/1999 |
| WO | 2004050557 A1 | 6/2004 |

(Continued)

OTHER PUBLICATIONS

Duhlev (R. Duhlev, et al., Double salt formation in MBr2-M'-H2O and M'CI2-M'CI2-H2O system (M, M'= Mg, Ca, Mn, Zn, Cd), Z. anorg. Allg. Chem, 549 (1987), 225-232.*
Mi Swaco A Schlumberger Company, "Divalent Brines". In "Completion Fluids Manual", 2012, 56 pages.
American Petroleum Institute, "Testing of Heavy Brines", API Recommended Practice 13J, 5th edition, 2014, pp. 9-32.
Author unknown, website page; http://webmineral.com/AtoZ/index.php?st=286&init-P; visited Jan. 19, 2020, 5 pages.
Duhlev, R. et al., "Double Salt Formation in MBr2-M' Br2-H2O and MCI2-M'CI2-H2O Systems (M, M'=Mg, Ca, Mn, Zn, Cd)", Z. anorg. allg. Chem., 1987, 549, pp. 225-232.

(Continued)

*Primary Examiner* — Kumar R Bhushan
(74) *Attorney, Agent, or Firm* — Troy Kleckley; Albemarle Corporation

(57) ABSTRACT

This invention provides zinc-free aqueous brine compositions. These zinc-free aqueous brine compositions have a density of about 14.3 pounds per gallon or more, and a true crystallization temperature of about 20° F. or less, and comprise water and one or more inorganic bromide salts, with the provisos that
when calcium bromide is present, one or more other water-soluble inorganic salts are also present,
when lithium bromide is present, calcium bromide is absent,
when bismuth(III) bromide is present, one or more other water-soluble inorganic salts are also present, and
for a true crystallization temperature of about 10° F. or less, when manganese(II) bromide is present, one or more other water-soluble inorganic salts are also present.
Processes for forming these zinc-free aqueous brine compositions are also provided.

24 Claims, No Drawings

(56) References Cited

FOREIGN PATENT DOCUMENTS

| WO | 2006065990 | A1 | 6/2006 |
| WO | 2008157050 | A1 | 12/2008 |

OTHER PUBLICATIONS

Jeu, Stephen J. et al. (2002). "Systematic Approach to Selecting Completion Fluids for Deepwater Subsea Wells Reduces Completion Problems". Paper presented at the AADE Technology Conference, Houston, Texas, Apr. 2-3, 2002, 9 pages.

Jolles, Z.E., ed. (1966). The Metallic Bromides. In "Bromine and its Compounds", pp. 105-146. London: Ernest Benn Limited.

"Maganese Nodule" http://en.wikipedia.org/wiki/Manganese_nodule; website visited Jul. 25, 2014; 4 pages.

\* cited by examiner

HIGH DENSITY AQUEOUS WELL FLUIDS

REFERENCE TO RELATED APPLICATIONS

This application is a continuation of U.S. application Ser. No. 15/502,914, filed Feb. 9, 2017, which application is the National Phase of International Patent Application PCT/US2015/041662, filed on Jul. 23, 2015, which application claims priority from U.S. Application No. 62/185,171, filed Jun. 26, 2015; U.S. Application No. 62/103,668 filed Jan. 15, 2015; and U.S. Application No. 62/036,912 filed Aug. 13, 2014, the disclosures of which are incorporated herein by reference.

TECHNICAL FIELD

This invention relates to high density aqueous brines suitable for use as well fluids.

BACKGROUND

Conventional aqueous brine fluids, like calcium bromide, which can have densities up to about 14.2 pounds per gallon (1.70 kg/L), are widely used in oilfield production as clear completion fluids, drilling fluids, packer fluids, and so forth. For some wells, downhole pressures can reach 30,000 psi ($2.1 \times 10^8$ Pa). Such high pressures occur downhole at least in the Gulf of Mexico, and temperatures at the mud line in the Gulf of Mexico can reach 40° F. (4.4° C.). As a general observation, each 10,000 pounds per square inch ($6.9 \times 10^7$ Pa) increase in pressure can increase the crystallization temperature of an aqueous brine by about ten Fahrenheit degrees (about 5.6 Celsius degrees).

Typical aqueous brine fluids include calcium bromide having densities up to about 14.2 ppg (1.70 kg/L). A calcium bromide aqueous brine of about 14.2 ppg (1.70 kg/L) density has a true crystallization temperature of 10° F. (−12.2° C.). Calcium bromide aqueous brines having densities as high as 15 ppg (1.8 kg/L) can be made; however, these solutions have a true crystallization temperature of about 61° F. (16.1° C.). These higher density calcium bromide aqueous brines are not suitable for use in some downhole applications, such as conditions often found in the Gulf of Mexico, because precipitates will form in these higher density calcium bromide aqueous brines due to their relatively high true crystallization temperatures.

Zinc-containing calcium bromide aqueous brines of high density, e.g., about 14.5 pounds per gallon (1.74 kg/L) or greater, are easily obtained by blending enough zinc bromide into the calcium bromide aqueous brine to reach the desired density value. Zinc-containing calcium bromide aqueous brines have true crystallization temperatures that are usually about 20° F. (−6.7° C.) or lower, making these zinc-containing brines more suitable for downhole use. However, inclusion of zinc necessitates increased reporting to government agencies for environmental reasons, resulting in more costly environmental mitigation measures. For example, zinc is regulated as a Priority Pollutant by the United States Environmental Protection Agency (EPA).

Hence, there is a need to develop high density aqueous brine fluids that are zinc-free, and that have true crystallization temperatures that are suitably low for downhole use.

SUMMARY OF THE INVENTION

This invention provides aqueous brines of high density and low crystallization temperature that are zinc-free. It has been discovered, for example, that a high density, zinc-free aqueous brine can be prepared from a combination of water and one or more inorganic bromide salts such as calcium bromide, manganese bromide ($MnBr_2$) tin bromide ($SnBr_2$ or $SnBr_4$), bismuth bromide, and/or indium bromide; calcium bromide is used in combination with one or more other water-soluble inorganic salts, preferably selected from an inorganic bromide salt, manganese(II) nitrate, and a water-soluble polytungstate salt; lithium bromide is used in combination with an alkali metal polytungstate salt; bismuth(III) bromide is used in combination with one or more other water-soluble inorganic salts, preferably selected from an inorganic bromide salt; when lithium bromide is present, calcium bromide is absent. Such brines can exhibit densities of about 15.0 ppg (1.78 kg/L) or greater, and have crystallization temperatures of about 20° F. (−6.7° C.) or less, often about 10° F. (−12.2° C.) or less. These brines are suitable for use as wellbore fluids, such as completion fluids, especially clear completion fluids, drilling fluids, packer fluids, workover fluids, and other fluids that employ aqueous brines, particularly aqueous brines of high density. The aqueous brines of this invention are well suited for offshore completion activities involving high pressure reservoirs, such as oil and gas fields located in the Gulf of Mexico.

An embodiment of this invention is a zinc-free aqueous brine composition. The composition has a density of about 14.3 pounds per gallon (1.71 kg/L) or more, and a true crystallization temperature of about 20° F. (−6.7° C.) or less, preferably about 10° F. (−12.2° C.) or less, and comprises water and one or more inorganic bromide salts, with the proviso that when calcium bromide is present, one or more other water-soluble inorganic salts is also present, preferably selected from an inorganic bromide salt, manganese(II) nitrate, and a water-soluble polytungstate salt; with the proviso that when bismuth(III) bromide is present, one or more other water-soluble inorganic salts is also present, preferably selected from an inorganic bromide salt, with the proviso that when lithium bromide is present, calcium bromide is absent, and with the proviso that for true crystallization temperatures of about 10° F. or less, when manganese(II) bromide is present, one or more other water-soluble inorganic salts are also present. Processes for forming these aqueous brine compositions are also provided.

These and other embodiments and features of this invention will be still further apparent from the ensuing description and appended claims.

FURTHER DETAILED DESCRIPTION OF THE INVENTION

As used throughout this document, the phrase "zinc-free" means that except for adventitious impurities, neither zinc nor zinc compounds are present in, or introduced into, the compositions or processes of this invention. Generally, there is about 25 ppm or less of zinc present in the aqueous brines of this invention.

The term ppm means parts per million (wt/wt), as used throughout this document, unless specifically stated otherwise herein. Throughout this document, both "ppg" and "lb/gal" are abbreviations for pounds per gallon.

The abbreviation "TCT" stands for true crystallization temperature (or true crystallization point) as used throughout this document. True crystallization temperature is the temperature at which precipitate begins to form in the absence of supercooling. A method for determining true crystallization temperature is described hereinbelow.

The phrases "inorganic bromide salt", "inorganic bromide", and "bromide salt" are used interchangeably throughout this document.

Solutions comprising one or more inorganic bromide salts and manganese(II) nitrate or a water-soluble polytungstate are aqueous brines of the present invention.

Because the compositions of the invention can be used as clear completion fluids, precipitates and/or cloudiness in the aqueous brines of the invention are undesirable. To be suitable for use as well fluids, the aqueous brines of the invention have little or no precipitate formation over time (e.g., about one week) at ambient temperature and pressure (e.g., 17 to 25° C. and 14 to 15 psi) or at elevated temperature (e.g., about 60° C.) and ambient pressure.

The compositions of the invention are aqueous brine solutions comprising one or more inorganic bromide salts other than zinc bromide. Although it is convenient to refer to compounds of bromide salts and to metal cations and bromide anions, the species in the compositions may be complexed with water, or in some other form. Similarly, the other water-soluble inorganic salts which are comprised in the aqueous brine solutions of the invention that are referred to as salts or their respective cations and/or anions may be complexed with water, or in some other form.

In the practice of this invention, the inorganic bromide salts are selected from calcium bromide, manganese(II) bromide, tin(II) bromide, tin(IV) bromide, bismuth(III) bromide, indium(III) bromide, and mixtures of any two or more of these; when calcium bromide is used, one or more other water-soluble inorganic salts is also used, and preferably is selected from an inorganic bromide salt, manganese(II) nitrate, and a water-soluble polytungstate salt; when bismuth (III) bromide is used, one or more other water-soluble inorganic salts is also used, and preferably is selected from an inorganic bromide salt. Manganese(II) bromide is preferably used in combination with one or more other water-soluble inorganic salts, especially when a brine with a true crystallization temperature of about 10° F. (−12.2° C.) or less is needed; in preferred embodiments, the other inorganic salt is preferably selected from an inorganic bromide salt, manganese(II) nitrate, and a water-soluble polytungstate salt, more preferably an inorganic bromide, which inorganic bromide is preferably calcium bromide or a combination of calcium bromide and one or more other inorganic bromide salts. In some embodiments, the inorganic bromide salt is lithium bromide in combination with an alkali metal polytungstate salt. Preferred inorganic bromide salts when only one bromide salt is present include tin(IV) bromide and indium(III) bromide, especially tin(IV) bromide. When two bromide salts are used, they are preferably a combination of calcium bromide and manganese(II) bromide; when three bromide salts are used, they are preferably a combination of calcium bromide, manganese(II) bromide and tin(IV) bromide, or a combination of calcium bromide, manganese(II) bromide, and bismuth(III) bromide.

In some preferred embodiments, the inorganic bromide salt is manganese(II) bromide, tin(II) bromide, tin(IV) bromide, indium(III) bromide, or a mixture of any two or more of these. In other preferred embodiments, the inorganic bromide salt is a combination of calcium bromide and one or more inorganic bromide salts selected from manganese (II) bromide, tin(II) bromide, tin(IV) bromide, bismuth(III) bromide, indium(III) bromide, or a mixture of any two or more of these. In another preferred embodiment, the inorganic bromide salt is a combination of bismuth(III) bromide and one or more inorganic bromide salts selected from manganese(II) bromide, tin(II) bromide, tin(IV) bromide, indium(III) bromide, or a mixture of any two or more of these. In still another preferred embodiment, one inorganic bromide salt is present, and the inorganic bromide salt is tin(IV) bromide or indium(III) bromide.

When the other water-soluble inorganic salt is a water-soluble polytungstate salt, it can be an alkali metal polytungstate, an alkaline earth metal polytungstate, manganese polytungstate, and the like. Alkali metal polytungstates include lithium polytungstate, lithium metatungstate, sodium polytungstate, sodium metatungstate, potassium polytungstate, potassium metatungstate, and the like; preferred alkali metal polytungstates include sodium metatungstate and potassium metatungstate. Alkaline earth metal polytungstates include calcium polytungstate, magnesium polytungstate, and strontium polytungstate; preferred alkaline earth polytungstates include calcium polytungstate. The term "metatungstate" often refers to a hydrated form of a polytungstate salt.

For the combination of lithium bromide with an alkali metal polytungstate salt, the alkali metal polytungstate salts include lithium polytungstate, lithium metatungstate, sodium polytungstate, sodium metatungstate, potassium polytungstate, potassium metatungstate, and the like; preferred alkali metal polytungstates include lithium metatungstate and sodium metatungstate.

When the inorganic salts of the aqueous brine are comprised only of inorganic bromide salts, the total amount of inorganic bromide salt(s) in the aqueous brine is typically in the range of about 40 wt % to about 75 wt %, relative to the total weight of the composition. Preferred total amounts of inorganic bromide salt(s) are from about 45 wt % to about 75 wt %, relative to the total weight of the composition.

In some embodiments, the total amount of inorganic bromide salt(s) in the aqueous brine is preferably in the range of about 45 wt % to about 65 wt %, more preferably about 55 wt % to about 65 wt %, relative to the total weight of the composition, especially when calcium bromide and one other inorganic bromide salt are used, and the other inorganic bromide salt is selected from tin(II) bromide, tin(IV) bromide, bismuth(III) bromide, and indium(III) bromide.

In other embodiments, the total amount of inorganic bromide salt(s) in the aqueous brine is preferably in the range of about 55 to about 70 wt %, relative to the total weight of the composition, especially when the inorganic bromide salts are calcium bromide and two other inorganic bromide salts, which other inorganic bromide salts are a combination of manganese(II) bromide and one other metal bromide selected from tin(II) bromide, tin(IV) bromide, bismuth(III) bromide, and indium(III) bromide.

When the inorganic salts of the aqueous brine are comprised of one or more inorganic bromide salts and one or more other water-soluble inorganic salts, the total amount of inorganic bromide salt(s) in the aqueous brine is typically in the range of about 15 wt % to about 60 wt %, preferably about 20 wt % to about 55 wt %, more preferably about 25 wt % to about 55 wt %, relative to the total weight of the composition. The total amount of the other water-soluble inorganic salt(s) varies, depending on the identity of the inorganic salt. For manganese(II) nitrate, the total amount in the aqueous brine is usually in the range of about 5 wt % to about 75 wt %, sometimes preferably about 35 wt % to about 70 wt %, sometimes preferably about 10 wt % to about 50 wt %, relative to the total weight of the composition; for water-soluble polytungstate salts, the total amount in the aqueous brine is typically in the range of about 5 wt % to about 40 wt %, preferably about 10 wt % to about 35 wt %, relative to the total weight of the composition.

The total amount of inorganic salts in an aqueous brine comprised of one or more inorganic bromide salts and one or more other water-soluble inorganic salts is in the range of about 60 wt % to about 85 wt %, sometimes preferably in the range of about 65 wt % to about 85 wt %, relative to the total weight of the composition when the other water-soluble inorganic salt is manganese(II) nitrate. When the other water-soluble inorganic salt is a water-soluble polytungstate, the total amount of inorganic salts in an aqueous brine comprised of one or more inorganic bromide salts and one or more other water-soluble inorganic salts is in the range of about 50 wt % to about 75 wt %, preferably in the range of about 55 wt % to about 70 wt %, relative to the total weight of the composition.

Compositions of the invention have densities of about 14.3 pounds per gallon (1.71 kg/L) or more. Preferably, the compositions have densities of about 14.6 ppg (1.75 kg/L) or more. In some embodiments, the compositions preferably have densities of about 14.8 ppg (1.77 kg/L) or more, or preferably about 15.0 ppg (1.80 kg/L) or more, or more preferably about 15.1 ppg (1.81 kg/L) or more. In other embodiments, especially when the inorganic bromide salt is calcium bromide and one or more inorganic bromide salts selected from tin(IV) bromide, bismuth(III) bromide, or indium(III) bromide, the compositions preferably have densities of about 16.0 ppg (1.92 kg/L) or more.

Density ranges for the compositions of this invention are preferably about 14.3 ppg (1.71 kg/L) to about 19.0 ppg (2.28 kg/L), more preferably about 14.6 ppg (1.75 kg/L) to about 18.0 ppg (2.16 kg/L). In some embodiments, preferred densities are about 14.8 ppg (1.77 kg/L) to about 16.0 ppg (1.92 kg/L), more preferably about 15.0 ppg (1.80 kg/L) to about 16.0 ppg (1.92 kg/L), and still more preferably about 15.1 ppg (1.81 kg/L) to about 15.6 ppg (1.87 kg/L). In other embodiments, preferred densities are about 14.6 ppg (1.75 kg/L) to about 15.0 ppg (1.80 kg/L), more preferably about 14.6 to about 14.8 ppg (1.77 kg/L). In still other embodiments, preferred densities are about 15.0 ppg (1.80 kg/L) to about 18.0 ppg (2.16 kg/L), more preferably about 15.5 ppg (1.86 kg/L) to about 17.75 ppg (2.13 kg/L). In yet other embodiments, especially when the inorganic bromide salt is calcium bromide and one other inorganic bromide salt selected from tin(IV) bromide, bismuth(III) bromide, or indium(III) bromide, preferred densities are about 16.0 ppg (1.92 kg/L) to about 17.5 ppg (2.10 kg/L), more preferably about 16.2 ppg (1.94 kg/L) to about 17.2 ppg (2.06 kg/L). In another embodiment, especially when the inorganic bromide salt is calcium bromide and manganese(II) nitrate is the other water-soluble inorganic salt, preferred densities are about 14.5 ppg (1.74 kg/L) to about 16.0 ppg (1.92 kg/L). In yet another embodiment, preferred densities are about 14.5 ppg (1.74 kg/L) to about 17.5 ppg (2.10 kg/L), more preferably about 14.5 ppg (1.74 kg/L) to about 16.5 ppg (1.98 kg/L), especially when the inorganic bromide salt is calcium bromide or manganese(II) bromide and the other water-soluble inorganic salt is a water-soluble polytungstate salt, or when the inorganic bromide salt is lithium bromide in combination with an alkali metal polytungstate salt.

For the compositions of the invention, the true crystallization temperatures are generally about 20° F. (−6.7° C.) or less, preferably about 10° F. (−12.2° C.) or less, more preferably about 8° F. (−13.3° C.) or less, and still more preferably about 7.5° F. (−13.6° C.) or less.

Aqueous brine compositions of the invention normally have pH values of about −2 or more, and can range from about −2 to about 8. Preferred pH values are in the range of about 0 to about 7; more preferred are pH values in the range of about 1 to about 6; still more preferred are pH values in the range of about 1.5 to about 5, especially about 2.5 to about 5. Even more preferred are pH values in the range of about 3 to about 4.

As is known in the art, it is often useful to include one or more optional additives in an aqueous brine, and the inclusion of such additives is within the scope of this invention. Optional additives can include, for example, corrosion inhibitors, lubricants, pH control additives, surfactants, and/or solvents. Glycerol and formic acid are preferred optional additives.

In some preferred zinc-free aqueous brine compositions of the invention, only water, inorganic bromide salts, one or more other water-soluble inorganic salts, and species derived from these components are present in the composition; in some of these preferred embodiments, one of the inorganic bromide salts is calcium bromide. In some of these preferred embodiments, the other water-soluble inorganic salts are selected from manganese(II) nitrate, and a water-soluble polytungstate salt, and more preferably, one of the inorganic bromide salts is calcium bromide.

In other preferred zinc-free aqueous brine compositions of the invention, only water, inorganic bromide salts, and species derived from these components are present in the composition; in some of these preferred embodiments, one of the inorganic bromide salts is calcium bromide. In other preferred zinc-free aqueous brine compositions of the invention, only water, tin(IV) bromide, and species derived from these components are present in the composition.

Preferred compositions of this invention include zinc-free aqueous brines which comprise water; calcium bromide; and one or more other inorganic bromide salts, preferably selected from manganese(II) bromide, tin(II) bromide, tin(IV) bromide, bismuth(III) bromide, indium(III) bromide, and mixtures of any two or more of these; wherein the composition has a density of about 14.3 ppg (1.71 kg/L) or more, preferably about 14.6 ppg (1.75 kg/L) or more, more preferably about 15.0 ppg (1.80 kg/L) or more; and a true crystallization temperature of about 20° F. (−6.7° C.) or less, preferably about 10° F. (−12.2° C.) or less, more preferably about 8° F. (−13.3° C.) or less. In these calcium bromide-containing compositions, the inorganic bromide salt(s) other than calcium bromide is preferably in an amount of about 3.0 wt % to about 40 wt %, relative to the total weight of the composition; preferably, these calcium bromide-containing compositions have a pH in the range of about 0 to about 8, more preferably about 1 to 7.

Additional preferred compositions of this invention include zinc-free aqueous brines which comprise water and one inorganic bromide salt selected from tin(IV) bromide and indium(III) bromide; more preferably tin(IV) bromide; wherein the composition has a density of about 15.0 ppg (1.80 kg/L) or more, preferably about 16.0 ppg (1.92 kg/L) or more, more preferably about 18.0 ppg (2.16 kg/L) or more.

In a preferred embodiment, the inorganic bromide salts are calcium bromide and manganese(II) bromide, and the composition has a density of about 14.6 ppg (1.75 kg/L) or more and a true crystallization temperature at atmospheric pressure of about 20° F. (−6.7° C.) or less, preferably about 10° F. (−12.2° C.) or less. Particularly preferred are compositions containing calcium bromide and manganese(II) bromide which have densities of about 15 lb/gal (1.8 kg/L) or more, and true crystallization temperatures at atmospheric pressure of about 8° F. (−13.3° C.) or less. Preferably, these compositions containing calcium bromide and manganese (II) bromide have pH values in the range of about 2.5 to 5, more preferably about 3 to 4.

In some preferred embodiments, the inorganic bromide salts are calcium bromide and manganese(II) bromide in combination with another inorganic bromide salt selected from tin(IV) bromide, tin(II) bromide, bismuth(III) bromide, and indium(III) bromide.

In another preferred embodiment, the inorganic bromide salts are calcium bromide, manganese(II) bromide, and tin(IV) bromide, and the composition has a density of about 15.0 ppg (1.80 kg/L) or more. Particularly preferred compositions containing calcium bromide, manganese(II) bromide, and tin(IV) bromide as the inorganic bromide salts have densities of about 16.0 ppg (1.92 kg/L) or more, more preferably densities of about 16.5 ppg (1.98 kg/L) or more.

In still another preferred embodiment, the inorganic bromide salts are calcium bromide, manganese(II) bromide, and bismuth(III) bromide, and the composition has a density of about 16.0 ppg (1.92 kg/L) or more. Particularly preferred compositions containing calcium bromide, manganese(II) bromide, and bismuth(III) bromide as the inorganic bromide salts have densities of about 16.3 ppg (1.95 kg/L) or more.

In another preferred embodiment, the inorganic bromide salt is calcium bromide, and manganese(II) nitrate is present; preferably, the composition has a density of about 14.5 ppg (1.74 kg/L) or more, more preferably about 14.8 ppg (1.77 kg/L) or more.

In yet another preferred embodiment, the inorganic bromide salt is calcium bromide or manganese(II) bromide, and a water-soluble polytungstate, preferably an alkali metal polytungstate, more preferably sodium metatungstate, is present; more preferably, the composition has a density of about 14.5 ppg (1.74 kg/L) or more, more preferably about 14.8 ppg (1.77 kg/L) or more.

In a further preferred embodiment, the inorganic bromide salt is lithium bromide in combination with an alkali metal polytungstate salt; more preferably the alkali metal polytungstate salt is lithium metatungstate or sodium metatungstate; more preferably, the composition has a density of about 14.5 ppg (1.74 kg/L) or more, more preferably about 14.8 ppg (1.77 kg/L) or more.

Zinc-free aqueous brines having a density of about 14.3 pounds per gallon (1.71 kg/L) or more and a true crystallization temperature of about 20° F. (−6.7° C.) or less are formed by processes which comprise combining, in any order, components comprising water and one or more inorganic bromide salts, with the proviso that when calcium bromide is present, one or more other water-soluble inorganic salts is also present, and preferably is selected from an inorganic bromide salt, manganese(II) nitrate, and a water-soluble polytungstate salt; with the proviso that when lithium bromide is present, calcium bromide is absent; with the proviso that when bismuth(III) bromide is present, one or more other water-soluble inorganic salts are also present; and with the proviso that, for a true crystallization temperature of about 10° F. or less, when manganese(II) bromide is present, one or more other water-soluble inorganic salts are also present.

The inorganic bromide salt(s) include calcium bromide, manganese(II) bromide, tin(II) bromide, tin(IV) bromide, bismuth(III) bromide, indium(III) bromide, and mixtures of any two or more of these. When calcium bromide is used, one or more other water-soluble inorganic salts, preferably selected from an inorganic bromide salt, manganese(II) nitrate, and a water-soluble polytungstate salt, is also used. When bismuth(III) bromide is used, one or more other water-soluble inorganic salts, preferably selected from an inorganic bromide salt, is also used. When lithium bromide is used, an alkali metal polytungstate salt is also used. Manganese(II) bromide is preferably used in combination with one or more other water-soluble inorganic salts, especially when a brine with a true crystallization temperature of about 10° F. (−12.2° C.) or less is needed; in preferred embodiments, the other inorganic salt is an inorganic bromide, manganese(II) nitrate, or a water-soluble polytungstate salt; the inorganic bromide is preferably calcium bromide or a combination of calcium bromide and one or more other inorganic bromide salts. When one inorganic bromide salt is used, it is preferably tin(IV) bromide or indium(III) bromide, more preferably, tin(IV) bromide. Manganese(II) bromide is preferred as an inorganic bromide salt to use with calcium bromide, especially when calcium bromide and one other bromide salt are present; when two bromide salts are used with calcium bromide, they are preferably a combination of manganese(II) bromide and tin(IV) bromide, or a combination of manganese(II) bromide and bismuth(III) bromide.

The combining of the water and inorganic bromide salt(s), and, when used, other water-soluble inorganic salts can be conducted in any manner used to mix inorganic salts and water. Normally and preferably, concentrated solutions of the inorganic salts can be mixed with addition or removal of water to provide the composition desired. Alternatively, the inorganic bromide salt(s) are added to the water. When there are two or more inorganic bromide salts, the inorganic bromide salts can be mixed with a portion of water before being combined with each other and, if needed, more water. When cofeeding the components or mixtures thereof, there is no requirement that the feeds be entirely co-extensive in time, and each feed may be interrupted at one or more points during the cofeeding. Another preferred way of operating when there are two or more inorganic bromide salts is to introduce one or more of the inorganic bromide salt(s) as a solid into a preformed aqueous solution of the other inorganic bromide salts(s). A combination of methods can be used as desired.

One or more of the inorganic bromide salts can be formed during the process. Formation of an inorganic bromide salt during the process can be used to form a portion of, or all of, the inorganic bromide salt. When an inorganic bromide salt is formed during the process, it can be formed in water before some or all of any other inorganic bromide(s) are introduced, or, preferably, in an aqueous solution of the other inorganic bromide(s).

An inorganic bromide salt can be formed during the process in various ways. In some embodiments, an inorganic bromide salt can be formed from the metal in elemental form and elemental bromine ($Br_2$), especially where the metal is calcium, manganese, tin, bismuth, and/or indium. For example, manganese metal and elemental bromine can be used to form manganese(II) bromide. In other embodiments, an inorganic bromide salt can be formed from an inorganic oxide and/or hydroxide and a bromide source which is hydrogen bromide and/or elemental bromine. In preferred embodiments, the inorganic bromide salt is formed from (i) an inorganic oxide and/or hydroxide and (ii) hydrogen bromide and/or bromine.

Inorganic oxides and/or hydroxides that can be used to form an inorganic bromide salt during the process include one or more of calcium oxide and/or hydroxide, manganese oxides and/or hydroxides, tin(II) oxide and/or hydroxide, tin(IV) oxide and/or hydroxide, bismuth(III) oxide and/or hydroxide, indium(III) oxide and/or hydroxide, or mixtures of any two or more of the foregoing. Preferred inorganic oxides and hydroxides include one or more manganese oxides and/or hydroxides, tin(IV) oxide and/or hydroxide, and bismuth(III) oxide and/or hydroxide. Of the manganese oxides and/or hydroxides, more preferred are manganese(II) oxide, manganese(II) hydroxide, and mixtures thereof; even more preferred is manganese(II) oxide.

When one or more inorganic oxides and/or hydroxides are used, the bromide source for forming an inorganic bromide during the process is hydrogen bromide, bromine, or a mixture thereof. Preferably, the bromide source is hydrogen bromide or a mixture of hydrogen bromide and bromine; more preferred is a mixture of hydrogen bromide and bromine. In these mixtures, the hydrogen bromide and bromine can be in any desired proportions from 100% hydrogen bromide to 100% $Br_2$, or at any relative proportion therebetween. For convenience, it may be preferable to employ a mixture in which hydrogen bromide is present. When bromine (elemental bromine, $Br_2$) is used, either alone or in admixture with hydrogen bromide, a reducing agent is also present, and is typically methanol, ethanol, formic acid, hydrazine, and the like.

For the combination of lithium bromide and an alkali metal polytungstate salt, the lithium bromide can be made by any of the methods described above, including from lithium metal and elemental bromine, and from lithium oxide and/or hydroxide and a bromide source (typically hydrogen bromide or elemental bromine).

In some preferred processes, the inorganic bromide salt is manganese(II) bromide, tin(II) bromide, tin(IV) bromide, indium(III) bromide, or a mixture of any two or more of these. In other preferred processes, the inorganic bromide salt is a combination of calcium bromide and manganese(II) bromide, tin(II) bromide, tin(IV) bromide, bismuth(III) bromide, indium(III) bromide, or a mixture of any two or more of these. In another preferred embodiment, a combination of bismuth(III) bromide and manganese(II) bromide, tin(II) bromide, tin(IV) bromide, indium(III) bromide, or a mixture of any two or more of these, is used. In still another embodiment, only one inorganic bromide salt is used, and the inorganic bromide salt is tin(IV) bromide or indium(III) bromide.

When one inorganic bromide salt is used to form a zinc-free aqueous brine of the invention, the inorganic bromide is typically in an amount in the range of about 40 wt % to about 75 wt %, preferably about 45 wt % to about 75 wt %, relative to the total weight of the aqueous brine composition being formed. When there are two or more inorganic bromide salts, this range refers to the combined weight of all of the inorganic bromide salts. When the composition contains calcium bromide, preferred amounts of inorganic bromide salts other than the calcium bromide in the aqueous brine are from about 5 wt % to about 35 wt %; more preferably about 6 wt % to about 30 wt %, relative to the total weight of the composition.

When an inorganic bromide and one or more other water-soluble inorganic salts are used to form a zinc-free aqueous brine of the invention, especially manganese(II) nitrate or a water-soluble polytungstate salt, the inorganic bromide is typically about 15 wt % to about 60 wt %, preferably about 20 wt % to about 55 wt %, more preferably about 25 wt % to about 55 wt %, relative to the total weight of the composition. When the other water-soluble inorganic salt is manganese(II) nitrate, the manganese(II) nitrate is generally in the range of about 5 wt % to about 75 wt %, sometimes preferably about 35 wt % to about 70 wt %, sometimes preferably about 10 wt % to about 50 wt %, relative to the total weight of the composition. When the other water-soluble inorganic salt is a water-soluble polytungstate salt, the polytungstate salt is usually in the range of about 5 wt % to about 40 wt %, preferably about 10 wt % to about 35 wt %, relative to the total weight of the composition.

When an inorganic bromide salt is formed during the process, the amount of that inorganic bromide salt is calculated as if the inorganic bromide salt had been added. Amounts of inorganic bromide salt will vary, depending to some extent on the amount(s) of other inorganic bromide(s), because less inorganic bromide salt is needed to reach a particular density value as the amount of other inorganic bromide salt(s) increases.

In some embodiments, when forming a zinc-free aqueous brine of the invention, the amount of inorganic bromide salt in the aqueous brine is preferably in the range of about 45 wt % to about 65 wt %, more preferably about 55 wt % to about 65 wt %, relative to the total weight of the composition, especially when calcium bromide and one other inorganic bromide salt are used, and the other inorganic bromide salt is selected from tin(II) bromide, tin(IV) bromide, bismuth(III) bromide, and indium(III) bromide.

In other embodiments, when forming a zinc-free aqueous brine of the invention, the amount of inorganic bromide salt in the aqueous brine is preferably in the range of about 55 to about 70 wt %, relative to the total weight of the composition, especially when the inorganic bromide salts are calcium bromide and two other inorganic bromide salts, which are a combination of manganese(II) bromide and another metal bromide selected from tin(II) bromide, tin(IV) bromide, bismuth(III) bromide, and indium(III) bromide.

The amount of water and/or the inorganic bromide salt(s) and/or other water-soluble inorganic salt(s) used to form the aqueous brines of the invention can be adjusted to reach the desired density. Removal of water, for example by heating and/or applying a vacuum, can be employed to reach the desired density for the zinc-free aqueous brine composition.

The zinc-free aqueous brine can be heated during combination of the components and/or after the components are combined, to ensure dissolution of the components. In this optional heating step, the mixture being formed during the process and/or the aqueous brine formed by the process is heated at a temperature of about 40° C. or above to form a heated solution. Elevated temperatures can increase the rate of dissolution of the inorganic bromide salt(s). Such elevated temperatures for heating the aqueous brine are typically in the range of about 40° C. up to the boiling point of the mixture, preferably about 45° C. to about 100° C., more preferably about 50° C. to about 95° C., and still more preferably about 60° C. to about 95° C. In some embodiments, it is preferred to operate under increased pressure, typically about 20 psi to about 40 psi ($1.4 \times 10^5$ to $2.77 \times 10^5$ Pa), because higher temperatures can be achieved. Upon cooling the aqueous brine to ambient temperatures (typically about 15° C. to about 25° C., often about 17° C. to about 23° C.), the inorganic bromide salt(s) usually remain dissolved.

Optionally, the pH of the zinc-free aqueous brine can be adjusted by adding an acid or a base as needed. Suitable acids include mineral acids and water-soluble organic acids; suitable bases are usually inorganic oxides and/or hydroxides. In some instances, upon introduction of an inorganic oxide and/or hydroxide to the zinc-free aqueous brine, a precipitate may form; after filtration, a clear aqueous brine is obtained.

For pH adjustment, suitable inorganic oxides and hydroxides which include oxides and hydroxides of manganese(II), tin(II), tin(IV), bismuth(III), indium(III), alkali metals including lithium, sodium, and potassium, alkaline earth metals including calcium and magnesium, and mixtures of any of these oxides and/or hydroxides, may be used. Preferred inorganic oxides and hydroxides include those of manganese, tin, calcium, and sodium. In some preferred embodiments, the inorganic oxide(s) and/or hydroxide(s) has one or more of the same cations already present in the aqueous brine. In some embodiments, a small amount of precipitate forms when an inorganic oxide and/or hydroxide is used to increase the pH. Once the precipitate has been removed, e.g., by filtration, additional precipitate formation usually does not occur.

Acids suitable for pH adjustment include mineral acids and organic acids that are water-soluble. Suitable mineral acids include hydrogen chloride, hydrogen bromide, hydrogen iodide, nitric acid, sulfuric acid, phosphoric acid, and the like. Suitable organic acids include formic acid, tartaric acid, citric acid, gluconic acid, lactic acid, malic acid, maleic acid, malonic acid, oxalic acid, and the like. Mixtures of any two or more acids can be employed if desired. Hydrogen bromide is a preferred acid, and can be used in gaseous form, or, preferably, as an aqueous solution.

Any optional additives that are included in the aqueous brines can be introduced in any of the ways that the inorganic bromide salt(s) are introduced, or in any other convenient manner.

Under storage conditions, aqueous brines having a density of about 15.0 ppg (1.80 kg/L) or greater often form a precipitate. Stabilization of these dense aqueous brines can be achieved by adjusting the pH of the aqueous brine. Adjustment of the pH value is accomplished by adding an inorganic hydroxide and/or oxide and/or by adding an acid, preferably hydrogen bromide, usually to a value in the range of about 1 to about 7, more preferably about 1 to about 6; still more preferably about 2.5 to about 5.

Small amounts of fine precipitates are sometimes formed in aqueous brine compositions of the invention which have a pH of about 3.5 or higher, and in which the inorganic bromide salts are calcium bromide and manganese(II) bromide. In particular, it has been discovered that decreasing the pH of the aqueous brine compositions may minimize or prevent further precipitate formation in the aqueous brine. In such instances, the pH can be adjusted as described above.

In some embodiments of this invention, the presence of glycerol and/or formic acid in the composition is preferred. Glycerol can be introduced at any point during the process of the invention by any convenient method for combining the glycerol and/or formic acid with the components of the process. A preferred method for inclusion of glycerol and/or formic acid is by adding glycerol and/or formic acid to the aqueous brine. When present, the amount of glycerol is preferably about 3 wt % to about 15 wt %, more preferably about 5 wt % to about 10 wt %, relative to the total weight of the composition. The amount of formic acid, when present, is typically about 500 ppm to about 5000 ppm, preferably about 750 ppm to about 3000 ppm, more preferably about 1000 ppm to about 2500 ppm, relative to the total weight of the composition. It has been observed that the presence of glycerol in manganese-containing aqueous brines of the invention may prevent or minimize precipitation in the aqueous brines, especially at pH values of about 3.5 or above.

In some preferred processes of this invention, only water, one or more inorganic bromide salts, and one or more other water-soluble inorganic salts are combined to form the zinc-free aqueous brines of this invention. In some of these preferred embodiments, the other water-soluble inorganic salts are selected from manganese(II) nitrate and a water-soluble polytungstate salt.

In some preferred processes of this invention, only water, one or more inorganic bromide salts, one or more inorganic oxides and/or hydroxides, and/or hydrogen bromide and/or bromine are combined to form the zinc-free aqueous brines of this invention.

Preferred processes of this invention comprise combining, in any order, components comprising water and one or more inorganic bromide salts preferably selected from the group consisting of calcium bromide, manganese(II) bromide, tin (II) bromide, tin(IV) bromide, bismuth(III) bromide, indium (III) bromide, and mixtures of any two or more of these; when calcium bromide is present, one or more other water-soluble inorganic salts, preferably selected from an inorganic bromide salt, manganese(II) nitrate, and a water-soluble polytungstate salt, is also present. When bismuth(III) bromide is present, one or more other water-soluble inorganic salts, preferably selected from an inorganic bromide salt, is also present. Lithium bromide is used in combination with one or more alkali metal polytungstate salts. Manganese(II) bromide is preferably used in combination with one or more other water-soluble inorganic salts preferably selected from an inorganic bromide salt, manganese(II) nitrate, and a water-soluble polytungstate salt; in preferred embodiments, the other inorganic salt is a bromide, and is calcium bromide or a combination of calcium bromide and one or more other inorganic bromide salts. When only one bromide salt is present, preferred inorganic bromide salts include tin(IV) bromide and indium(III) bromide, especially tin(IV) bromide. When two bromide salts are used, they are preferably a combination of calcium bromide and manganese(II) bromide; when three bromide salts are used, they are preferably a combination of calcium bromide, manganese(II) bromide and tin(IV) bromide, or a combination of calcium bromide, manganese(II) bromide, and bismuth(III) bromide.

The composition formed has a density of about 14.3 ppg (1.71 kg/L) or more, preferably of about 14.6 ppg (1.75 kg/L) or more; and a true crystallization temperature of about 20° F. (−6.7° C.) or less, preferably about 10° F. (−12.2° C.) or less. An aqueous brine in which the only salt is manganese(II) bromide at a density of 15.0 ppg (1.80 kg/L) has a true crystallization temperature of about −10.3° C. In some embodiments, the compositions formed preferably have densities of about 14.8 ppg (1.77 kg/L) or more, or preferably about 15.0 ppg (1.80 kg/L) or more, or more preferably about 15.1 ppg (1.81 kg/L) or more. In other embodiments, especially when the inorganic bromide salts are calcium bromide and another inorganic bromide selected from tin(IV) bromide, bismuth(III) bromide, or indium(III) bromide, the compositions preferably have densities of about 16.0 ppg (1.92 kg/L) or more. When in combination with calcium bromide, the other inorganic bromide salt is usually in an amount of about 3.0 wt % to about 45 wt %, preferably about 5 wt % to about 40 wt %; more preferably about 6 wt % to about 35 wt %, relative to the total weight of the composition formed. When calcium bromide is used in combination with manganese(II) nitrate, the manganese (II) nitrate is usually in the range of about 30 wt % to about 75 wt %, sometimes preferably about 35 wt % to about 70 wt %, sometimes preferably about 10 wt % to about 50 wt %, relative to the total weight of the composition formed. When calcium bromide or manganese(II) bromide is used in combination with a water-soluble polytungstate salt, the water-soluble polytungstate salt is typically in the range of about 5 wt % to about 40 wt %, preferably about 10 wt % to about 35 wt %, relative to the total weight of the composition formed. When a combination of lithium bromide and one or more alkali metal polytungstate salts is used, the alkali metal polytungstate salt is generally in the range of about 5 wt % to about 40 wt %, preferably about 10 wt % to about 35 wt %, relative to the total weight of the composition formed.

In some preferred processes, the water, inorganic bromide salt(s) and, when used, one or more other water-soluble inorganic salts are combined to form an aqueous solution. In other preferred processes, one or more inorganic bromide salts are formed during the process from hydrogen bromide and/or bromine and an inorganic oxide and/or hydroxide. The inorganic oxide and/or hydroxide is preferably selected from oxides and/or hydroxides of calcium, manganese(II), tin(II), tin(IV), bismuth(III), indium(III), and mixtures of any two or more of the foregoing. When oxides and/or hydroxides of calcium are used, one or more other water-soluble inorganic salts, preferably selected from an inorganic bromide salt, manganese(II) nitrate, and a water-soluble polytungstate salt, are also included. When oxides and/or hydroxides of manganese are used, they are preferably used in combination with one or more other water-soluble inorganic salts preferably selected from an inorganic bromide salt, manganese(II) nitrate, and a water-soluble polytungstate salt. For lithium bromide in combination with a water-soluble polytungstate salt, lithium bromide can be formed from lithium oxide and/or hydroxide with hydrogen bromide and/or bromine.

Preferred combinations of inorganic oxides and/or hydroxides are oxides and/or hydroxides of manganese(II), tin(II), tin(IV), indium(III), and/or bismuth(III), in combination with calcium bromide or oxides and/or hydroxides of calcium. Also preferred as the inorganic oxides and/or hydroxides are combinations of calcium bromide or oxides and/or hydroxides of calcium with oxides and/or hydroxides of manganese(II); and/or tin(IV); combinations of calcium bromide or oxides and/or hydroxides of calcium with oxides and/or hydroxides of manganese(II) and oxides and/or hydroxides of tin(IV), or a combination of calcium bromide with oxides and/or hydroxides of manganese(II) bromide and oxides and/or hydroxides bismuth(III) bromide. When only one inorganic bromide salt is present, preferred inorganic oxides and/or hydroxides are oxides and/or hydroxides of tin(IV), and oxides and/or hydroxides of indium(III), especially oxides and/or hydroxides of tin(IV).

Optionally, the processes further comprise heating the aqueous brine during and/or after combining the components; temperatures and preferences therefor are as described above.

These preferred processes can further comprise adjusting the pH to a value in the range of about 1 to about 7 by adding an acid and/or an inorganic oxide and/or hydroxide to the aqueous brine composition; preferably, the inorganic oxide and/or hydroxide is an oxide and/or hydroxide of calcium, manganese(II), or tin(II), tin(IV), bismuth(III), indium(III), or mixtures of any two or more of these. Preferred pH ranges are as described above.

Naturally-occurring manganese is present in manganese nodules, more accurately called polymetallic nodules, on the seabed. These nodules are formed in oceans throughout the world, and the most abundant metals in these nodules are manganese and iron.

The following examples are presented for purposes of illustration, and are not intended to impose limitations on the scope of this invention.

In the following Examples, the densities of the solutions were determined by the oscillating U-tube technique, which measures the frequency of the oscillation of the liquid sample.

True crystallization temperature determinations in the Examples were determined by one of the two the procedures described here.

Classical Procedure.

A jacketed glass tube containing 50 mL of sample was mechanically stirred while being cooled using a recirculating bath containing a cooling fluid (for example, glycol). When the sample reached a temperature about 10° C. above the expected first crystal to appear (FCTA) temperature, the sample was cooled at a rate of approximately 0.5° C./min. or a smaller temperature increment until the TCT (true crystallization temperature) is observed. The FCTA temperature was recorded at the lowest temperature reached before precipitation, and the TCT was recorded at the highest temperature achieved immediately after precipitation started. The sample was removed from the recirculating bath and warmed; when all of the precipitate had disappeared, the last crystal to dissolve (LCTD) temperature was recorded. Each determination was run with a seed crystal of silica (≤50 μm, ~0.03 g) in the sample.

Instrument Procedure.

A sample cup containing 0.25 mL of the sample was placed in a Cloud, Pour, and Freeze Point Lab Analyzer (model no. 70Xi; Phase Technology, Richmond, Canada), and the sample was cooled at 0.5 degrees Celsius per minute until freezing was detected by diffusive light-scattering.

Comparative Example 1

Measurements of the true crystallization temperature (TCT) were made on three samples of calcium bromide aqueous solutions. These samples contained only water and calcium bromide. Results are summarized in Table 1 below.

Comparative Example 2

Two samples were prepared starting from 50.0 g of an aqueous $CaBr_2$ solution having a density of 14.2 ppg (1.70 kg/L). To one sample more $CaBr_2$ (4.32 g) was added; to the other sample, $ZnBr_2$ (3.19 g) was added. Results are summarized in Table 1 below.

Comparative Example 3

Two samples were prepared starting from 40.0 g of an aqueous $CaBr_2$ solution having a density of 12.8 ppg (1.53 kg/L). To one sample more $CaBr_2$ (13.18 g) was added; to the other sample, $ZnBr_2$ (11.90 g) was added. Results are summarized in Table 1 below.

Comparative Example 4

A series of samples was prepared starting from 50.0 g of an aqueous $CaBr_2$ solution having a density of 14.2 ppg (1.70 kg/L). The salts LiBr (4.18 g), $SrBr_2.6H_2O$ (7.01 g), and $BaBr_2$ (2.21 g) were added to separate $CaBr_2$ solutions. Testing of the strontium-containing and barium-containing samples was discontinued due to solubility and density issues.

Another series of samples was prepared, starting from 40.0 g of an aqueous $CaBr_2$ solution having a density of 12.8 ppg (1.53 kg/L). The salts LiBr (15.18 g), and $MgBr_2.6H_2O$ were added to separate $CaBr_2$ solutions. Testing of the magnesium-containing sample was discontinued due to solubility and density issues. Results are summarized in Table 1 below.

TABLE 1

| Compar. Ex. | Run | Inorganic bromides | Non-CaBr$_2$ bromide amount[a] | Total bromide amount[a] | Density | TCT[b] |
|---|---|---|---|---|---|---|
| 1 | a | CaBr$_2$ | none | 56.3 wt % | 14.76 ppg (1.769 kg/L) | 35.6° F. (2.0° C.) |
|   | b | CaBr$_2$ | none | 56.0 wt % | 14.68 ppg (1.759 kg/L) | 32.9° F. (0.5° C.) |
|   | c | CaBr$_2$ | none | 55.4 wt % | 14.58 ppg (1.747 kg/L) | 24.8° F. (−4.0° C.) |
| 2 | a | CaBr$_2$ | none | 56.9 wt % | 14.54 ppg (1.742 kg/L) | 22.1° F. (−5.5° C.) |
|   | b | CaBr$_2$, ZnBr$_2$ | 6.0 wt % | 56.0 wt % | 14.57 ppg (1.746 kg/L) | <−5.8° F. (<−21.0° C.) |
| 3 | a | CaBr$_2$ | none | 58.5 wt % | 14.63 ppg (1.753 kg/L) | 26.6° F. (−3.0° C.) |
|   | b | CaBr$_2$, ZnBr$_2$ | 22.9 wt % | 57.5 wt % | 14.67 ppg (1.757 kg/L) | <−5.8° F. (<−21.0° C.) |
| 4 | a | CaBr$_2$, LiBr | 7.7 wt % | 56.8 wt % | 14.55 ppg (1.743 kg/L) | 33.8° F. (1.0° C.) |
|   | b | CaBr$_2$, LiBr | 27.5 wt % | 66.1 wt % | 14.60 ppg (1.749 kg/L) | 39.2° F. (4.0° C.) |

[a]Relative to total weight of solution.
[b]True crystallization temperature; determined by the classical procedure.

Example 1

A sample was prepared starting from 50.0 g of an aqueous CaBr$_2$ solution having a density of 14.2 ppg (1.70 kg/L). MnBr$_2$ (3.27 g) was added to the CaBr$_2$ solution. Results are summarized in Table 2 below.

Example 2

A sample was prepared starting from 40.0 g of an aqueous CaBr$_2$ solution having a density of 12.8 ppg (1.53 kg/L). MnBr$_2$ (10.18 g) was added to the CaBr$_2$ solution. Results are summarized in Table 2 below.

Example 3

Five separate samples were prepared by adding an amount of MnBr$_2$ to aqueous CaBr$_2$ solutions of densities ranging from 13.4 to 14.0 ppg (1.61 to 1.68 kg/L) to obtain aqueous brines with densities of about 14.6 to 15.1 ppg (1.75 to 1.81 kg/L). Some of the samples were filtered to remove haziness. All of the samples were then analyzed to determine their density and true crystallization temperature (TCT). Results are summarized in Table 2 below.

Example 4

Into a 500 ml flask was placed 160 grams of a CaBr$_2$ solution having a density of 14.2 ppg (1.70 kg/L). The solution was heated to 60° C. and then 30 grams of SnBr$_2$ powder was added with stirring. After stirring for about 1 hour at 60° C., all of the SnBr$_2$ had dissolved, to give a hazy light tan solution. The solution was cooled to ambient temperature and then vacuum filtered through a 1 micron filter medium, to give a clear colorless solution having a density of 16 ppg (1.9 kg/L). To a portion (about 90 g) of this solution, deionized water (9 g) was added to give, after mixing, a solution with a density of 15 ppg (1.8 kg/L). Both samples were stored in a 6 to 7° F. (−14.4 to −13.9° C.) freezer overnight, and after 24 hours remained clear and colorless with no precipitate. Results are summarized in Table 2 below.

Example 5

Into a 3 L jacketed round-bottom flask equipped with a mechanical stirrer, a thermocouple, and an addition funnel was charged aqueous CaBr$_2$ (14.2 ppg; 673.68 g), deionized water (126.32 g), and MnO powder (99 wt %, 67.92 g). While mixing, this slurry was heated at 67° C., and aqueous HBr (48 wt %; 320.96 g) was added over 1 hour via the addition funnel. After holding at 67° C. for 40 minutes, aqueous NaOH (50 wt %) or aqueous HBr (48 wt %) was used to titrate the pH to 4.89; some solid formation was observed. The total amount of HBr and/or NaOH solution added was less than 10 g. After cooling to room temperature, the mixture was filtered under vacuum, more aqueous HBr (48 wt %) was added to adjust the pH to 3.0 to 3.5. A total of 2.04 g of NaOH solution was added; less than 5 g of aqueous HBr were added. Water (159 g) was removed under weak vacuum at 54° C. to give a clear pink solution (1004 g) with a density of 1.78 g/mL (14.8 ppg) and a pH of 3.4. Results are summarized in Table 2 below.

Example 6

Into a 3 L jacketed round-bottom flask equipped with a mechanical stirrer, a thermocouple, and an addition funnel was charged aqueous CaBr$_2$ (14.2 ppg; 673.68 g), deionized water (126.32 g), and MnO powder (99 wt %, 67.92 g). While mixing, this slurry was heated at 67° C. and aqueous HBr (48 wt %; 320.96 g) was added over 1 hour via the addition funnel. After holding at 67° C. for 35 minutes, aqueous HBr (48 wt %; 0.12 g) was added to titrate the pH to 3.18; some solid formation was observed. After cooling to room temperature, the mixture was filtered under vacuum. Water (165.6 g) was removed under weak vacuum at 54° C. to give a clear pink solution (1010 g) with a density of 1.78 g/mL (14.9 ppg) and a pH of 3.03. Results are summarized in Table 2 below.

TABLE 2

| Ex. | Run | Inorganic bromides | Non-CaBr$_2$ bromide amount[a] | Total bromide amount[a] | Density | TCT[b] |
|---|---|---|---|---|---|---|
| 1 | — | CaBr$_2$, MnBr$_2$ | 6.1 wt % | 56.1 wt % | 14.76 ppg (1.769 kg/L) | 10.4° F. (−12.0° C.) |
| 2 | — | CaBr$_2$, MnBr$_2$ | 20.3 wt % | 56.0 wt % | 14.63 ppg (1.753 kg/L) | <−13° F. (−25° C.) |
| 3 | a | CaBr$_2$, MnBr$_2$ | 9.3 wt % | 56.5 wt % | 14.89 ppg (1.784 kg/L) | <−7.6° F. (−22° C.) |
|   | b | CaBr$_2$, MnBr$_2$ | 14.4 wt % | 56.5 wt % | 15.01 ppg (1.799 kg/L) | −9.4° F. (−23.0° C.) |
|   | c | CaBr$_2$, MnBr$_2$ | 13.6 wt % | 55.3 wt % | 15.10 ppg (1.809 kg/L) | 7.7° F. (−13.5° C.) |
|   | d | CaBr$_2$, MnBr$_2$ | 13.6 wt % | 57.6 wt % | 14.67 ppg (1.758 kg/L) | <−13° F (−25° C.) |
|   | e | CaBr$_2$, MnBr$_2$ | 20.1 wt % | 57.2 wt % | 14.63 ppg (1.753 kg/L) | <−13° F. (−25° C.) |
| 4 | a | CaBr$_2$, SnBr$_2$ | 15.8 wt % | 60.6 wt % | 16 ppg (1.9 kg/L) | low[c] |
|   | b | CaBr$_2$, SnBr$_2$ | 6.4 wt % | 47.1 wt % | 15 ppg (1.8 kg/L) | low[c] |
| 5 | — | CaBr$_2$, MnO/HBr | 20.0 wt %[d] | 55.7 wt % | 14.8 ppg (1.78 kg/L) | −14.8° F. (−26° C.) |
| 6 | — | CaBr$_2$, MnO/HBr | 20.1 wt %[d] | 55.6 wt % | 14.9 ppg (1.78 kg/L) | −13° F. (−25° C.) |

[a]Relative to total weight of solution.
[b]True crystallization temperature; determined by the classical procedure.
[c]Below the temperature of the freezer (6 to 7° F.; −14.4 to −13.9° C.); no precipitate had formed in the samples after 1 week in the freezer.
[d]Calculated as MnBr$_2$.

Example 7

Several CaBr$_2$/MnBr$_2$ aqueous brine samples with different pH values were prepared starting from a CaBr$_2$/MnBr$_2$ aqueous brine prepared as in Example 5. The pH value of each sample was adjusted by adding aqueous HBr (48 wt %) and/or aqueous NaOH (50%) until the desired pH value was reached. In each sample, the total amount of HBr and/or NaOH solution added was less than 5 g. Some of the samples to which NaOH was added formed a small amount of precipitate; these samples were filtered. These samples with different pH values were placed in a 60° C. oven to heat-age for one week. The turbidity and presence or absence of a precipitate were observed visually and recorded at the end of the week. Results are summarized in Table 3 below.

Example 8

Several CaBr$_2$/MnBr$_2$ aqueous brine samples with different pH values were prepared starting from a CaBr$_2$/MnBr$_2$ aqueous brine prepared as in Example 5. The pH value of each sample was adjusted by adding aqueous HBr (48 wt %) and/or aqueous NaOH (50%) until the desired pH value was reached. In each sample, the total amount of HBr and/or NaOH solution added was less than 10 g. Some of the samples to which NaOH was added formed a small amount of precipitate; these samples were filtered. To some of the samples, enough glycerol was added to make a solution containing either 5 wt % or 10 wt % glycerol. These samples were placed in a 60° C. oven to heat-age for one week. The turbidity and presence or absence of a precipitate were observed visually and recorded at the end of the week. Results are summarized in Table 3 below.

Example 9

Example 8 was repeated, except that the samples were allowed to sit at ambient temperature rather than oven-aging. Results are summarized in Table 3 below.

Example 10

Several CaBr$_2$/MnBr$_2$ aqueous brine samples having a pH of about 3.5 or less as in Example 5 were used. To these samples, enough glycerol was added to make a solution containing either 5 wt % or 10 wt % glycerol. All of these solutions remained clear; no precipitate was observed in any of the solutions over time at room temperature.

TABLE 3

| Ex. | Inorganic bromides | Glycerol amt.[a] | pH | Turbidity | Precip. | Aging temp. |
|---|---|---|---|---|---|---|
| 7 | CaBr$_2$, MnBr$_2$ | 0 | 1.00 | clear | none | 60° C. |
|   |   |   | 1.99 | clear | none |   |
|   |   |   | 3.00 | clear | none |   |
|   |   |   | 3.16 | clear | none |   |
|   |   |   | 3.30 | clear | none |   |
|   |   |   | 3.40 | clear | none |   |
|   |   |   | 3.62 | cloudy | none |   |
|   |   |   | 3.99 | cloudy | yes |   |
|   |   |   | 4.28 | cloudy | yes |   |
| 8 | CaBr$_2$, MnBr$_2$ | 0 | 4.58 | cloudy | yes | 60° C. |
|   |   | 5% | 4.58 | cloudy | none |   |
|   |   | 0 | 4.28 | cloudy | yes |   |
|   |   | 5% | 4.28 | clear | none |   |
|   |   | 10% | 4.28 | clear | none |   |
| 9 | CaBr$_2$, MnBr$_2$ | 0 | 4.58 | cloudy | yes | ambient |
|   |   | 5% | 4.58 | clear | none |   |
|   |   | 0 | 4.28 | cloudy | yes |   |
|   |   | 5% | 4.28 | clear | none |   |
|   |   | 10% | 4.28 | clear | none |   |

[a]Relative to total weight of solution.

Example 11

A sample was prepared starting from 100.0 g of an aqueous $CaBr_2/MnBr_2$ (1.75:1 (wt:wt) $CaBr_2:MnBr_2$) clear brine fluid having a density of 15.0 ppg (1.80 kg/L). $SnBr_2$ (7.00 g) was mixed with the $CaBr_2/MnBr_2$ clear brine fluid at 48° C. After the solids had dissolved, the mixture was cooled to room temperature and then vacuum filtered through a 2 micron glass filter, to give a clear liquid having a density of 15.8 ppg (1.89 kg/L). Some of the water was removed under vacuum at 54° C. to give a clear brine fluid with a density of 16.0 ppg (1.92 kg/L). A sample of this clear brine fluid was analyzed to determine its true crystallization temperature (TCT), which was below −23° C. Results are summarized in Table 4 below.

In Examples 12, 13, 14, 15 and 16, the densities were measured with calibrated graduated cylinders. In this method, a 50 mL graduated cylinder was calibrated using 30.000 g of deionized water. The volume (29.7 mL) was recorded to calibrate the scale on the graduated cylinder. Each well fluid sample (29.7 mL) was weighed, and the density was calculated by using the following formula: density (g/mL)=mass (g)/29.7 mL. For smaller sample sizes, a 10 mL graduated cylinder was calibrated and used in the same manner to determine the densities.

Example 12

Several samples were prepared by mixing an amount of either $SnBr_4$ (4.00 g; 9.00 g) or $BiBr_3$ (4.00 g; 6.00 g) with 27.00 g of an aqueous $CaBr_2/MnBr_2$ (1.75:1 (wt:wt) $CaBr_2$: $MnBr_2$) clear brine fluid having a density of 14.8 ppg (1.77 kg/L). All of the samples were then analyzed to determine their density. Each sample was filtered through a 1 micron syringe filter, and a portion of each sample was placed in a freezer at −16° C., and another portion of each sample was placed in an oven at 60° C. All of the samples in both the oven and the freezer remained clear after 3 days or longer. Results are summarized in Table 4 below.

Example 13

Two samples were prepared by mixing an amount of $SnBr_2$ (1.30 g; 4.00 g) with 27.00 g of an aqueous $CaBr_2/MnBr_2$ (1.75:1 (wt:wt) $CaBr_2:MnBr_2$) clear brine fluid having a density of 15.3 ppg (1.83 kg/L). Both of the samples were then analyzed to determine their density. Each sample was filtered through a 1 micron syringe filter, then enough formic acid to make a concentration of 2000 ppm in the solution was added. Then a portion of each sample was placed in a freezer at −16° C., and another portion of each sample was placed in an oven at 60° C. The samples in both the oven and the freezer remained clear after one week. Results are summarized in Table 5 below.

Example 14

Two separate samples were prepared by mixing either $SnBr_2$ (6.00 g) or $BiBr_3$ (6.00 g) with an aqueous $CaBr_2$ solution containing formic acid (2000 ppm) and having a density of 14.2 ppg (1.70 kg/L). Both of the samples were then analyzed to determine their density. Each sample was filtered through a 1 micron syringe filter, then enough formic acid to make a concentration of 2000 ppm in the solution was added. Then a portion of each sample was placed in a freezer at −16° C., and another portion of each sample was placed in an oven at 60° C. The samples in both the oven and the freezer remained clear overnight or longer. Results are summarized in Table 5 below.

TABLE 4

| Ex. | Run | Inorganic bromides | Non-$CaBr_2$ bromide amount[a] | $MnBr_2$ amount[a] | Total bromide amount[a] | Density | Soln, remained clear at −16° C. |
|---|---|---|---|---|---|---|---|
| 11 | — | $CaBr_2$, $MnBr_2$, $SnBr_2$ | 26.3 wt % | 19.6 wt % | 60.6 wt % | 16.0 ppg (1.92 kg/L) | at least one week |
| 12 | a | $CaBr_2$, $MnBr_2$, $SnBr_4$ | 30.6 wt % | 17.7 wt % | 61.5 wt % | 16.1 ppg (1.93 kg/L) | at least one week[b] |
| | b | $CaBr_2$, $MnBr_2$, $SnBr_4$ | 40.3 wt % | 15.3 wt % | 66.9 wt % | 17.5 ppg (2.10 kg/L) | at least 3 days[c] |
| | c | $CaBr_2$, $MnBr_2$, $SnBr_4$ | 34.9 wt % | 16.7 wt % | 64.0 wt % | 16.7 ppg (2.00 kg/L) | at least one day |
| | d | $CaBr_2$, $MnBr_2$, $BiBr_3$ | 30.6 wt % | 17.7 wt % | 61.5 wt % | 16.3 ppg (1.95 kg/L) | at least one week[c] |
| | e | $CaBr_2$, $MnBr_2$, $BiBr_3$ | 41.0 wt % | 20.7 wt % | 61.5 wt % | 16.5 ppg (1.98 kg/L) | at least one week |

[a]Relative to total weight of solution.
[b]True crystallization temperature −34.95° C.; determined by the instrument procedure.
[c]True crystallization temperature below −32° C.; determined by the instrument procedure.

TABLE 5

| Ex. | Run | Inorganic bromides | Non-CaBr$_2$ bromide amount[a] | MnBr$_2$ amount[a] | Total bromide amount[a] | Density | Soln, remained clear at −16° C. |
|---|---|---|---|---|---|---|---|
| 13 | a | CaBr$_2$, MnBr$_2$, SnBr$_2$ | 24.0 wt % | 19.4 wt % | 57.9 wt % | 15.9 ppg (1.90 kg/L) | at least one week |
|  | b | CaBr$_2$, MnBr$_2$, SnBr$_2$ | 30.6 wt % | 17.7 wt % | 61.5 wt % | 16.3 ppg (1.95 kg/L) | at least one week |
| 14 | a | CaBr$_2$, SnBr$_2$ | 18.2 wt % | none | 61.7 wt % | 16.2 ppg (1.94 kg/L) | at least overnight |
|  | b | CaBr$_2$, BiBr$_3$ | 18.2 wt % | none | 61.7 wt % | 16.6 ppg (1.99 kg/L) | at least 2 days |

[a]Relative to total weight of solution.

Example 15

Several samples were prepared by mixing an amount of one or more inorganic bromide salts, and in some instances deionized water and formic acid, with an amount of an aqueous calcium bromide solution having a density of 14.2 ppg (1.70 kg/L; WellBrom®, Albemarle Corporation). Each mixture was heated to dissolve the solids. Details for each solution are as follows:

formic acid (80.0 mg) and InBr$_3$ (6.00 g); deionized water (0.50 g) had been added to 27.00 g of the calcium bromide solution; heating was at 50° C.;

InBr$_3$ (6.90 g) and 27.00 g of the calcium bromide solution; heating was at 48 to 50° C.;

an aqueous solution of MnBr$_2$ (14.10 g; 50.3 wt %) and InBr$_3$ (6.96 g); 13.15 g of the calcium bromide solution; heating was at 48 to 50° C.; and formic acid (80.0 mg) and SnBr$_4$ with 27.00 g of the calcium bromide solution, to which deionized water (0.73 g) had been added; heating was at 49° C.

After the solids had dissolved, the mixture was cooled to room temperature. After cooling to room temperature, each solution was analyzed to determine its density. A sample from each solution was placed in a freezer at −16° C., and another sample from each solution was placed in an oven at 60° C. Results are summarized in Table 6 below.

Example 16

A sample was prepared by mixing SnBr$_4$ (10.17 g) and deionized water (4.11 g) containing HBr (0.02 g; 48%). The mixture was heated at 35° C. to dissolve the solids. After the solids had dissolved, the mixture was cooled to room temperature, yielding a clear liquid having a density of 18.8 ppg (2.25 kg/L). A sample from the solution was placed in a freezer at −16° C., and another sample from the solution was placed in an oven at 60° C. The samples in both the oven and the freezer remained clear after 72 hours. Results are summarized in Table 6 below.

Example 17

A sample was prepared by mixing InBr$_3$ and deionized water in amounts to form a clear solution having a density of 16.0 ppg (1.92 kg/L), a sample of which was placed in a freezer at −16° C. Results are summarized in Table 6 below.

TABLE 6

| Ex. | Run | Inorganic bromide(s) | Non-CaBr$_2$ bromide amount[a] | Total bromide amount[a] | Formic acid[a] | Density | Soln, remained clear at −16° C. |
|---|---|---|---|---|---|---|---|
| 15 | a | CaBr$_2$, InBr$_3$ | 17.9 wt % | 60.8 wt % | 2280 ppm | 16.0 ppg (1.92 kg/L) | at least 6 days |
|  | b | CaBr$_2$, MnBr$_2$, InBr$_3$ | 36.6 wt % | 64.9 wt % | none | 17.2 ppg (2.06 kg/L) | at least 72 hrs.[b] |
|  | c | CaBr$_2$, MnBr$_2$, InBr$_3$ | 41.0 wt % | 61.5 wt % | none | 16.6 ppg (1.99 kg/L) | at least 96 hrs. |
|  | d | CaBr$_2$, SnBr$_4$ | 24.5 wt % | 63.7 wt % | 2700 ppm | 16.5 ppg (1.98 kg/L) | at least 6 days |
| 16 | — | SnBr$_4$ | 71.1 wt % | 71.1 wt % | none | 18.8 ppg (2.25 kg/L) | at least 72 hrs. |
| 17 | — | InBr$_3$ | 60 wt % | 60 wt % | none | 16.0 ppg (1.92 kg/L) | at least 24 hrs. |

[a]Relative to total weight of solution.
[b]True crystallization temperature below −32° C.; determined by the instrument procedure.

Example 18

Several samples were prepared by dissolving an amount of Mn(NO$_3$)$_2$.H$_2$O in deionized water at ambient temperature, adding CaBr$_2$ to the solution, and in some instances also adding HNO$_3$ or HCl. Each mixture was heated to dissolve the solids. Details for each solution are as follows:

a) Mn(NO$_3$)$_2$.H$_2$O (24.4 g) and deionized water (10.70 g), CaBr$_2$ (20.45 g) added at 56° C.;

b) Mn(NO$_3$)$_2$.H$_2$O (12.20 g) and deionized water (5.35 g), CaBr$_2$ (10.23 g), HNO$_3$ (conc., 65 mg) was then added;

c) Mn(NO$_3$)$_2$.H$_2$O (12.20 g) and deionized water (2.09 g), CaBr$_2$ (5.02 g);

d) Mn(NO$_3$)$_2$.H$_2$O (12.20 g) and deionized water (5.35 g), then added HCl (conc.; 58 mg), then CaBr$_2$ (10.23 g).

After the solids had dissolved, each mixture was cooled to room temperature. The cooled solutions were clear. After cooling to room temperature, each sample was filtered through a 1 micron syringe filter and analyzed to determine its density. A portion of each sample was placed in a freezer at −16° C. All of the samples in the freezer remained crystal-free for at least one week. Results are summarized in Table 7 below.

Example 19

A sample was prepared by adding Mn(NO$_3$)$_2$.H$_2$O (3.00 g) to an aqueous CaBr$_2$ solution (57.6 wt %, 25.05 g). The mixture was heated to 50° C. and then cooled to room temperature to give a clear, light pink solution with a density of 15.3 ppg (1.83 kg/L). After filtration through a 1-micron syringe filter, a portion of the sample was placed in a freezer at −16° C., and another portion of the sample was placed in an oven at 60° C. Both samples remain clear after 24 hours. Results are summarized in Table 7 below.

c) MnBr$_2$ (aq., 50 wt %, 15.00 g), deionized water (2.00 g), sodium metatungstate hydrate (6.00 g); heating was at 50 to 58° C.

After the solids had dissolved, each mixture was cooled to room temperature. After cooling to room temperature, each sample was filtered through a 1 micron syringe filter, and clear, colorless solutions were obtained. Each sample was then analyzed to determine its density. A portion of each sample was placed in a freezer at −16° C. All of the samples in the freezer remained clear at least overnight. Results are summarized in Table 8 below.

Example 21

Two samples were prepared by mixing an amount of lithium bromide with a metatungstate salt. Details for each solution are as follows:

A) LiBr (8.00 g) was dissolved in deionized water (12.04 g). Into this solution was added sodium metatungstate hydrate (8.33 g), to give a colorless solution with a density of 15.0 ppg (1.80 kg/L); and

TABLE 7

| Ex. | Run | Inorganic bromide | Total bromide amount[a] | Total Mn(NO$_3$)$_2$ amount[a] | Acid | Density | Soln, remained clear at −16° C. |
|---|---|---|---|---|---|---|---|
| 18 | a | CaBr$_2$ | 36.8 wt % | 43.9 wt % | — | 14.9 ppg (1.79 kg/L) | at least one week |
| 18 | b | CaBr$_2$ | 36.7 wt % | 43.8 wt % | HNO$_3$ | 14.9 ppg (1.79 kg/L) | at least one week |
| 18 | c | CaBr$_2$ | 26.0 wt % | 57.2 wt % | — | 15.1 ppg (1.81 kg/L) | at least one week |
| 18 | d | CaBr$_2$ | 36.7 wt % | 39.7 wt % | HCl | 15.0 ppg (1.80 kg/L) | at least one week |
| 19 | — | CaBr$_2$ | 51.4 wt % | 10.7 wt % | — | 15.3 ppg (1.83 kg/L) | at least 24 hrs. |

[a]Relative to total weight of solution.

Example 20

Several samples were prepared by diluting an aqueous solution of either CaBr$_2$ or MnBr$_2$ with deionized water and adding an amount of sodium metatungstate to the diluted solution at ambient temperature. Each mixture was then heated. Details for each solution are as follows:

a) CaBr$_2$ (aq., 53.2 wt %, 15.05 g), deionized water (2.81 g), sodium metatungstate hydrate (4.50 g); heating was at 54-56° C.;

b) MnBr$_2$ (aq., 50 wt %, 15.00 g), deionized water (2.00 g), sodium metatungstate hydrate (3.29 g); heating was at 35° C.;

B) LiBr (10.00 g) was dissolved in deionized water (10.00 g). Into this solution was added an aqueous lithium metatungstate solution (ρ=2.95 g/mL) to give a colorless solution with density of 16.3 ppg (1.95 kg/L).

Each solution was filtered through a 1-micron syringe filter, after which a portion of each sample was placed in a freezer at −16° C., and another portion of each sample was placed in an oven at 60° C. Both the freezer and oven samples from run A remained clear after one week. Both the freezer and oven samples from run B remained clear after at least 20 hours. Results are summarized in Table 8 below.

TABLE 8

| Ex. | Run | Inorganic bromide | Total bromide amount[a] | Total metatungstate salt amount[a] | Density | TCT[b] |
|---|---|---|---|---|---|---|
| 20 | a | CaBr$_2$ | 35.8 wt % | 20.0 wt % | 14.9 ppg (1.79 kg/L) | −27.8° C. |
| 20 | b | MnBr$_2$ | 37.0 wt % | 18.8 wt % | 15.3 ppg (1.83 kg/L) | —[c] |
| 20 | c | MnBr$_2$ | 32.6 wt % | 25.9 wt % | 16.4 ppg (1.97 kg/L) | −31.0° C. |
| 21 | A | LiBr | 28.2 wt % | 29.4 wt % | 15.0 ppg (1.80 kg/L) | −29.8° C. |
| 21 | B | LiBr | | | 16.3 ppg (1.95 kg/L) | —[d] |

[a]Relative to total weight of solution.
[b]True crystallization temperature; determined by the instrument procedure.
[c]Solution remained clear at −16° C. overnight.
[d]Solution remained clear at −16° C. for at least 20 hours.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A wellbore fluid comprising a zinc-free aqueous brine having a density of 1.71 kg/L (14.3 pounds per gallon) to 2.28 kg/L (19.0 pounds per gallon), and a true crystallization temperature of −6.7° C. (20° F.) or less, which aqueous brine comprises calcium bromide and a manganese salt selected from manganese(II) bromide, manganese(II) nitrate, and manganese polytungstate.

2. The wellbore fluid of claim 1 wherein the manganese salt is manganese(II) bromide.

3. The wellbore fluid of claim 1 in which the aqueous brine has a density of 1.75 kg/L (14.6 pounds per gallon) or more.

4. The wellbore fluid of claim 2 in which the aqueous brine has a density of 1.75 kg/L (14.6 pounds per gallon) or more and a pH value in the range of 2.5 to 5.

5. The wellbore fluid of claim 2 also comprising tin(IV) bromide, wherein the aqueous brine has a density of 1.80 kg/L (15.0 pounds per gallon) or more.

6. The wellbore fluid of claim 2 also comprising bismuth (III) bromide, and wherein the aqueous brine has a density of 1.92 kg/L (16.0 pounds per gallon) or more.

7. The wellbore fluid of claim 2 also comprising tin(II) bromide or indium(III) bromide.

8. The wellbore fluid of claim 2 which also comprises
   tin(II) bromide, wherein the aqueous brine has a density of 1.80 kg/L (15.0 pounds per gallon) or more; or
   indium(III) bromide, wherein the aqueous brine has a density of 1.92 kg/L (16.0 pounds per gallon) or more.

9. A process for forming a wellbore fluid comprising a zinc-free aqueous brine having a density of 1.71 kg/L (14.3 pounds per gallon) to 2.28 kg/L (19.0 pounds per gallon), and a true crystallization temperature of −6.7° C. (20° F.) or less, which process comprises mixing, in any order, components comprising water, calcium bromide and a manganese salt selected from manganese(II) bromide, manganese (II) nitrate, and manganese polytungstate.

10. The process of claim 9 wherein the manganese salt is manganese(II) bromide.

11. The process of claim 9 in which the aqueous brine has a density of 1.75 kg/L (14.6 pounds per gallon) or more.

12. The process of claim 10 in which the aqueous brine has a density of 1.75 kg/L (14.6 pounds per gallon) or more and a pH value in the range of 2.5 to 5.

13. The process of claim 10 wherein the aqueous brine also comprises tin(IV) bromide, wherein the aqueous brine has a density of 1.80 kg/L (15.0 pounds per gallon) or more.

14. The process of claim 10 wherein the aqueous brine also comprises bismuth(III) bromide, and wherein the aqueous brine has a density of 1.92 kg/L (16.0 pounds per gallon) or more.

15. The process of claim 10 wherein the aqueous brine also comprises tin(II) bromide or indium(III) bromide.

16. The process of claim 10 wherein the aqueous brine also comprises
   tin(II) bromide, wherein the aqueous brine has a density of 1.80 kg/L (15.0 pounds per gallon) or more; or
   indium(III) bromide, wherein the aqueous brine has a density of 1.92 kg/L (16.0 pounds per gallon) or more.

17. A method of treating a wellbore, said method comprising:
   introducing into the wellbore a wellbore fluid comprising a zinc-free aqueous brine having a density of 1.71 kg/L (14.3 pounds per gallon) to 2.28 kg/L (19.0 pounds per gallon), and a true crystallization temperature of −6.7° C. (20° F.) or less, which fluid comprises calcium bromide and a manganese salt selected from manganese(II) bromide, manganese(II) nitrate, and manganese polytungstate.

18. The method of claim 17 wherein the manganese salt is manganese(II) bromide.

19. The method of claim 17 in which the aqueous brine has a density of 1.75 kg/L (14.6 pounds per gallon) or more.

20. The method of claim 18 in which the aqueous brine has a density of 1.75 kg/L (14.6 pounds per gallon) or more and a pH value in the range of 2.5 to 5.

21. The method of claim 18 wherein the aqueous brine also comprises tin(IV) bromide, and wherein the aqueous brine has a density of 1.80 kg/L (15.0 pounds per gallon) or more.

22. The method of claim 18 wherein the aqueous brine also comprises bismuth(III) bromide, and wherein the aqueous brine has a density of 1.92 kg/L (16.0 pounds per gallon) or more.

23. The method of claim 18 wherein the aqueous brine also comprises tin(II) bromide or indium(III) bromide.

24. The method of claim 18 wherein the aqueous brine also comprises
- tin(II) bromide, wherein the aqueous brine has a density of 1.80 kg/L (15.0 pounds per gallon) or more; or
- indium(III) bromide, wherein the aqueous brine has a density of 1.92 kg/L (16.0 pounds per gallon) or more.

* * * * *